United States Patent
Murtazin et al.

(10) Patent No.: US 12,320,700 B2
(45) Date of Patent: Jun. 3, 2025

(54) METHOD AND DEVICE FOR PROCESSING TWO-DIMENSIONAL OPTICAL SPECTRA

(71) Applicant: Thermo Fisher Scientific (Bremen) GmbH, Bremen (DE)

(72) Inventors: Ayrat Murtazin, Bremen (DE); Konstantin Ayzikov, Bremen (DE); Sebastian Geisler, Bremen (DE); Lothar Rottmann, Ganderkesee (DE); Alexander Makarov, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 182 days.

(21) Appl. No.: 17/756,840

(22) PCT Filed: Dec. 10, 2020

(86) PCT No.: PCT/EP2020/085472
§ 371 (c)(1),
(2) Date: Jun. 3, 2022

(87) PCT Pub. No.: WO2021/116268
PCT Pub. Date: Jun. 17, 2021

(65) Prior Publication Data
US 2023/0018735 A1    Jan. 19, 2023

(30) Foreign Application Priority Data
Dec. 11, 2019 (GB) .................................. 1918157

(51) Int. Cl.
*G01J 3/18* (2006.01)
*G01J 3/28* (2006.01)
*G06T 5/70* (2024.01)

(52) U.S. Cl.
CPC ............... *G01J 3/1809* (2013.01); *G01J 3/28* (2013.01); *G01J 3/2803* (2013.01); *G01J 2003/2859* (2013.01); *G06T 5/70* (2024.01)

(58) Field of Classification Search
CPC .......... G01J 3/1809; G01J 3/28; G01J 3/2803; G01J 2003/2859; G06T 5/70
(Continued)

(56) References Cited

U.S. PATENT DOCUMENTS 3,069,654 A    12/1962  Hough
5,596,407 A *  1/1997  Zander .................. G01J 3/2803
                                              250/208.6
(Continued)

OTHER PUBLICATIONS

Dabiao Zhou, Dejiang Wang, Lijun Huo, and Ping Jia, "Destripe Hyperspectral Images with Spectral-spatial Adaptive Unidirectional Variation and Sparse Representation," J. Opt. Soc. Korea 20, 752-761 (2016). (Year: 2016).*
(Continued)

*Primary Examiner* — Mohamed K Amara
*Assistant Examiner* — Noah J. Haney
(74) *Attorney, Agent, or Firm* — William R. McCarthy, III

(57) ABSTRACT

A method of processing two dimensional optical spectra, such as echelle spectra, is disclosed. The optical spectra comprise sections having a relatively high intensity separated by borders having a relatively low intensity. The optical spectra have been digitized (61) by a detector. The method comprises denoising (62) an optical spectrum, searching (64) for at least one series of neighboring local extrema of the optical spectrum, fitting (65) a line through each series of neighboring local extrema, each line representing a section, identifying (67) any peaks and their respective locations, and storing (68) the lines and the locations of any peaks.

30 Claims, 6 Drawing Sheets

(58) Field of Classification Search
USPC ........................................................ 356/328
See application file for complete search history.

(56) References Cited

U.S. PATENT DOCUMENTS

| | | | | |
|---|---|---|---|---|
| 5,719,672 | A | * | 2/1998 | Chien ..................... G01J 3/189 356/328 |
| 7,319,519 | B2 | | 1/2008 | Florek et al. |
| 7,876,435 | B2 | | 1/2011 | Becker-Ross et al. |
| 8,736,836 | B2 | | 5/2014 | Chrisp et al. |
| 10,309,831 | B2 | | 6/2019 | Li et al. |
| 2004/0114139 | A1 | * | 6/2004 | Florek ....................... G01J 3/02 356/328 |
| 2008/0094626 | A1 | * | 4/2008 | Becker-Ross ......... G01J 3/0232 356/328 |
| 2008/0106735 | A1 | | 5/2008 | Becker-Ross et al. |
| 2009/0316146 | A1 | | 12/2009 | Beardsley et al. |
| 2011/0013556 | A1 | * | 1/2011 | Molnar ..................... G06T 1/00 370/328 |
| 2016/0048950 | A1 | * | 2/2016 | Baron ................. H03M 7/3062 382/275 |
| 2017/0016767 | A1 | | 1/2017 | Day et al. |
| 2017/0284867 | A1 | * | 10/2017 | Gensemer ............. G01J 3/0221 |
| 2018/0128679 | A1 | | 5/2018 | Neitsch et al. |
| 2019/0025121 | A1 | * | 1/2019 | Münch .................. G01J 3/2803 |
| 2020/0191650 | A1 | * | 6/2020 | Sobol ..................... G01J 3/4531 |

OTHER PUBLICATIONS

Ching-Wei Chang and Mary-Ann Mycek, "Precise fluorophore lifetime mapping in live-cell, multi-photon excitation microscopy," Opt. Express 18, 8688-8696 (2010). (Year: 2010).*

Ballester P: "Finding Echelle Orders by Hough Transform", Jan. 1, 1991 (Jan. 1, 1991), pp. 23-28, XP055777735, Retrieved from the Internet: URL: http://articles.adsabs.harvard.edu/pdf/1991ESOC...38...23B [retrieved on Feb. 18, 2021].

Hall et al., "The Reduction of Fiber-Fed Echelle Spectrograph Data: Methods and an IDL-Based Solution Procedure", Publications of the Astronomical Society of the Pacific, vol. 106, XP055768165, Mar. 1, 1994 (Mar. 1, 1994), pp. 315-326.

PCT/EP2020/085472, Search Report and Written Opinion, Mar. 3, 2021, 16 pages.

Sadler D.A., et al., "Automatic Wavelength Calibration Procedure for Use with an Optical Spectrometer and Array Detector", Journal of Analytical Atomic Spectometry, vol. 10, 1995, 253-257.

Selesnick et al., "Simultaneous Low-Pass Filtering and Total Variation Denoising", IEEE Transactions on Signal Processing, vol. 62, No. 5, XP011539529, Mar. 1, 2014 (Mar. 1, 2014), pp. 1109-1124.

Tyler G., et al., "Echelle Optics Explained Simply," ICP Optical Emission Spectroscopy Technical Note 04, 3 pages.

* cited by examiner

METHOD AND DEVICE FOR PROCESSING TWO-DIMENSIONAL OPTICAL SPECTRA

CROSS-REFERENCE TO RELATED APPLICATIONS

This application is a 371 national phase of International application no. PCT/EP2020/085472 filed Dec. 10, 2020, which claims priority to GB application no. 1918157.7 filed Dec. 11, 2019, which disclosures are herein incorporated by reference in their entirety.

FIELD OF THE INVENTION

The present invention relates to processing optical spectra. More in particular, the present invention relates to a method of processing two-dimensional optical spectra, such as echelle spectra, in analytical atomic spectroscopy and similar fields. In addition, the present invention relates to a method of producing a template for use in processing optical spectra, to utilizing such a template, and to an optical spectrum processing device and an optical spectrography device in which such a method is utilized.

BACKGROUND OF THE INVENTION

It is well known to use optical spectra to analyze matter in various applications. In the field of absorption spectroscopy, for example, part of the energy from an optical source is absorbed by an analyte at specific wavelengths, leaving a characteristic optical spectrum of the energy which is not absorbed. Such a characteristic optical spectrum makes it possible to identify the chemical composition of the analyte. Similarly, in emission spectroscopy a characteristic optical spectrum of energy released by an analyte is obtained. Such optical spectra are typically one-dimensional: the wavelengths of the spectra can be plotted on a line.

In modern methods of analytical atomic spectrometry which use echelle spectrometers and detectors, the information on the chemical composition of an analyte is contained in a two-dimensional spectrum known as echellogram or echelle spectrum. The position of the spectral peaks of the echellogram is related to the atomic emission or absorption (depending on the type of experiment) wavelengths specific to particular elements. The position of the spectral peaks therefore contains information on the identity of the elements present in the sample. The intensity of the peak(s) is indicative of the amount of the element(s) present. In principle, echellograms contain the complete atomic compositional profile of the sample. The accuracy of the atomic compositional profile of the analyte is directly dependent on the precision with which the positions and intensities of the spectral components can be determined.

A typical echelle spectrum consists of bands or sections which may contain spectral peaks. In the literature relating to echelle spectra, the sections are typically referred to as "orders" while the peaks are typically called "lines". To avoid any confusion, in this document the word "line" is intended to have its dictionary meaning, while the word "peak" is used to refer to the intensity peaks of an echelle spectrum.

The two-dimensional spectrum image captured by a detector may be degraded for several reasons. The original spectrum may have a wide dynamic range which may be difficult to capture in a single exposure. The detector may have a limited number of pixels capturing the spectrum of interest. The original spectrum may contain multiple noise components, may contain a background structure, and/or may suffer from interference (that is, overlap) inside its sections. If a one-dimensional array detector is used, scanning the two-dimensional spectrum may introduce further degradations.

To achieve the desired accuracy when determining the positions and intensities of the spectral peaks, the two-dimensional optical spectrum is typically processed, for example to compensate for any shifts and/or to calibrate wavelengths. An example of such processing techniques is provided in the paper "Automatic wavelength calibration procedure for use with an optical spectrometer and array detector" by D. A. Sadler, D. Littlejohn and C. V. Perkins, J. Anal. At. Spectrom., 1995, Vol. 10, pp. 253-257.

U.S. Pat. No. 7,876,435 discloses a method to determine and correct broadband background in complex spectra, such as echelle spectra. This known method includes recording a spectral graph, smoothing the recorded spectral graph, and reducing values exceeding the smoothed graph. A resulting background graph is subtracted from the initial graph. The smoothing of the graph is carried out by using a moving average. Repeated smoothing using a moving average is also described.

It has been found that a simple background subtraction is insufficient to accurately determine the positions and the intensities of a two-dimensional spectrum, such as an echelle spectrum. It has further been found that smoothing a spectrum by using a moving average results in a loss of resolution and is therefore unsuitable for applications where a high accuracy is desired.

The paper "The Reduction of Fiber-Fed Echelle Spectrograph Data: Methods and an IDL-Based Solution Procedure" by J. C. Hall et al., Publications of the Astronomical Society of the Pacific, Vol. 106, March 1994, pp. 315-326, discloses extracting spectra of astronomical objects from fiber-fed echelle data frames produced by CCDs (charge coupled devices). Averaging is used to reduce noise. However, averaging reduces the accuracy, which is generally undesired in the field of spectrometry. The algorithms described in the paper by Hall et al. are particularly suitable to applications in the field of astronomy but less suitable for use in the field of analytical atomic spectroscopy, for example.

SUMMARY OF THE INVENTION

It is an object of the invention to overcome the problems of the prior art and to provide a method and device for processing optical spectra, in particular two-dimensional optical spectra, which provides a greater accuracy in determining the positions and the intensities of the spectrum, in particular but not exclusively of the peaks of the spectrum.

According to a first aspect, the present invention provides a method of processing optical spectra. According to a second aspect, the present invention provides a method of detecting sections in optical spectra, comprising producing a template by the method according to the first aspect and match the template with optical spectra. According to a third aspect, the present invention provides a software program product allowing a processor to carry out the method of any of the first and the second aspect. According to a fourth aspect, the present invention provides an optical spectrum processing device configured for carrying out the method of the first and/or the second aspect.

Accordingly, the present invention provides a method of processing two-dimensional optical spectra, such as echelle spectra, the optical spectra comprising sections having a relatively high intensity separated by borders having a relatively low intensity, the optical spectra having been digitized by a detector, the method comprising:

denoising an optical spectrum, searching for at least one series of neighboring local extrema of the optical spectrum, fitting a line through each series of neighboring local extrema, each line representing a section, identifying any peaks and their respective locations, and storing the lines and the locations of any peaks.

By denoising the sample optical spectrum, the signal-to-noise ratio of the sample optical spectrum can be significantly improved, thus leading to an improved accuracy without a substantial loss of detail. In particular, denoising prepares the sample spectrum for subsequent processing steps. It is noted that denoising does preferably not involve smoothing, as smoothing typically results in data loss and therefore loss of accuracy.

By searching for one or more series of neighboring local extrema of the optical spectrum, the sections of the optical spectrum can be identified. That is, if the neighboring local extrema are local minima, they are likely to represent a border between sections. If the neighboring local extrema are local maxima, they are likely to represent a ridge of a section, which ridge will typically be located approximately halfway between its borders. In some embodiments, either local minima or local maxima will be detected. In other embodiments, however, both local minima and local maxima may be detected.

In embodiments in which a two-dimensional array detector is used to digitize the optical spectra, the local extrema may be determined per column of pixels of the array detector. Thus, the local extrema are the local extrema per array detector column, and for each column of pixels of the array the local extrema may be determined. Depending on the orientation of the optical spectrum relative to the array detector, the local extrema may be determined per row of pixels of the two-dimensional array detector. It will be understood that in embodiments in which a scanning one-dimensional array detector is used, the local extrema may be determined similarly, for example by determining local extrema per each single (1D) array.

By fitting a line through each series or string of neighboring local extrema, the borders between the sections (in the case of local minima) or ridges of the sections (in the case of local maxima) and hence the individual sections of the spectrum can be identified. When the lines define borders between sections, each pair of lines represents a section enclosed by them. Each line may be comprised in more than one pair of lines, as adjacent sections may share a line defining their common boundary. When the lines define ridges of the sections, each individual line can be said to represent a section.

It is noted that neighboring local extrema may comprise closest local extrema. That is, two extrema may be referred to as neighboring extrema if for at least one of the two extrema the other extremum has the shortest distance of all extrema to it. The distance may be expressed using any suitable distance measure, such as Euclidean distance ($L_2$ distance) or city block distance ($L_1$ distance), for example. In practice, adjacent columns of an array of image pixels may each have a local extremum at the same row or only a few rows away, thus making the search for series of neighboring extrema simple. In some embodiments, sub-sampling may be used, potentially leading to distances smaller than a single pixel width.

By identifying any peaks and their respective locations, the characteristic features of the sections are determined. The locations of the peaks are preferably determined relative to their sections, which are orders in the case of echelle spectra. That is, the location of a peak may indicate a section identification (such as an order number) and a location reference relative to the particular order. Additionally, the height and/or intensity of a peak may be determined. However, embodiments can be envisaged in which the peaks are not detected, only the sections.

By storing the lines or the pairs of lines and the locations of any peaks as a template, further spectra can be processed more quickly and efficiently, as will later be explained in more detail. A template may be suitable for a set of spectra of, for example, the same or a similar analyte.

The method may further comprise using feature extraction for fitting a line through each series of neighboring local extrema. That is, fitting a line may be assisted by a feature extraction technique to better fit the line and to decrease the influence of noise, which may result in outliers.

In the method according to the invention, feature extraction may comprise applying the Hough transform. By applying the Hough transform, it is achieved that outliers of the series of extrema are easily identified and excluded or corrected. The original Hough transform is disclosed in U.S. Pat. No. 3,069,654 to P. Hough and is a transform based on polar coordinates. It has been found that fitting a smooth line through the extrema of a two-dimensional spectrum is more effective when the coordinates of the local extrema have been transformed into polar coordinates, for example by using a Hough transform.

The lines fitted through each series of neighboring local extrema may be substantially smooth lines. That is, at least some of the lines may be completely smooth or at least mainly smooth. The smoothness of the fitted lines may for example be determined by measuring the smallest angle between two straight line sections connecting three consecutive pixels. The line may be called smooth if the angle is at least 160°, preferably at least 170°, more preferably at least 175°.

The method as described above may further comprise using edge detection for searching for series of neighboring local extrema. That is, edge detection techniques which may be known per se may be used for finding series of local extrema and subsequently fitting a line through each series. Examples of edge detection techniques are described in P. Perona and J. Malik. "Scale-space and edge detection using anisotropic diffusion." IEEE® Transactions on Pattern Analysis and Machine Intelligence, Vol. 12, No. 7, July 1990, pp. 629-639.

In the method according to the invention, angles of the fitted lines relative to an axis of the sample optical spectrum may be limited to a predetermined range. In a typical echelle spectrum, the orders extend approximately horizontally relative to the array detector, although this will of course depend of the orientation of the array detector relative to the imaging optics. Any fitted lines of which the angles deviate significantly from the horizontal may therefore be erroneous and may be based on outliers, for example.

By limiting the angles of the fitted lines, for example to less than 30° from the horizontal or less than 20° from the horizontal in case of a substantially horizontal orientation, errors may be reduced or be avoided altogether. In addition to the angles, the curvature of the lines may be determined. In such embodiments, a restriction may be imposed on the curvature of the lines, for example by requiring that a curvature radius has a minimum length. That is, using the a priori knowledge that the angles and the curvatures of the sections lie within a certain range, that range (or a similar range) may be imposed upon the sections, thus limiting the impact of any detection errors.

The local extrema of the sample optical spectrum may comprise local maxima, in which case a fitted line may represent a ridge of a respective section. The ridge of a section may substantially coincide with the trajectory of the section. That is, if a section is an order, the ridge may represent the trajectory or general orientation of the order.

Alternatively, or additionally, the local extrema of the optical spectrum may comprise local minima. In that case, each line may represent a border between sections. For example, each line may represent a border between two orders. In some embodiments, both the borders and the ridges may be determined. In some embodiments, lines representing borders may be stored per pair, thus storing the data defining the borders of a section (e.g. order) together.

Denoising may comprise applying a total variation denoising (TVD) algorithm. As mentioned above, denoising is to be preferred above smoothing, as smoothing typically results in data loss. Various total variation denoising algorithms are known to those skilled in the art. The basic algorithm is described in the paper by L. I. Rudin, S. Osher and E. Fatemi: "Nonlinear total variation based noise removal algorithms", Physica D. 60 (1-4); 259-268 (1992), the entire contents of which are herewith incorporated by reference. In particular, it has been found that denoising is particularly suitable for optical spectroscopy. It has also been found that denoising, for example by using the TVD algorithm, is particularly suitable for CID (charge injection device) detector arrays, which typically have 1 A/D (analog/digital) converter per pixel, which in turn may result in a higher dark current than CCD (charge coupled device) detector arrays, for example.

The method according to the invention may further comprise determining an intensity of at least one identified peak. By determining the intensity or height of a peak in addition to its location, a better identification of the analyte can be obtained.

The determined location of the at least one identified peak may comprise an identification of the section in which said peak is located. That is, the location may include a section identification (for example an order number) in addition to a relative location within the order and/or an absolute location within the pixel array produced by the array detector.

Identifying a peak may comprise determining a (local) maximum within a section, for example a (local or global) maximum of a ridge. Although peaks may be identified based on other metrics, such as volume or intensity (taking for example the peak extent in two directions as well as its height into account), determining a (local or global) maximum is an effective and computationally simple way to identify a peak. It is noted that when detecting peaks, the local maxima may not be determined per pixel column or per pixel row per order or per ridge. Thus, a peak may be represented by a local maximum of a detected ridge. Thus, when searching for a peak, a local maximum in two directions (dimensions) is to be detected.

The method according to the invention may further comprise:
  defining at least one partial spectrum prior to detecting boundaries, each partial spectrum being smaller than the optical spectrum, and
  detecting boundaries per individual partial spectrum.

That is, one or more partial spectra may be defined which are subjected to some or all of the above mentioned method steps. By using a partial spectrum instead of the whole spectrum, that is using a sub-array instead of the whole array of pixels, the individual method steps can be carried out much faster and much more efficiently. At least two partial spectra may be defined, and many more partial spectra may be defined, such as four, eight, twelve, sixteen, thirty-two or more partial spectra. The number of partial spectra may depend on the original spectrum and/or on the processing power of the available hardware, for example. The partial spectra may also be referred to as windows or sub-images.

At least some partial spectra may have no overlap, and thus have no pixels in common. This may be the case when the partial spectra are located in certain predetermined parts of the spectrum, for example in parts where a peak is expected to appear. In such a case, not all partial spectra may border on another partial spectrum. However, at least some partial spectra may have some overlap. In some embodiments, all partial spectra can have at least some overlap. The partial spectra may together cover less than the optical spectrum, preferably less than 50% of the optical spectrum, more preferably less than 25% of the optical spectrum, in some instances less than 10% of the optical spectrum, or even less than 5% of the optical spectrum. In some embodiments, however, the partial spectra may together cover the entire optical spectrum.

The optical spectrum may comprise a first area having a relatively high information density and a second area having a relatively low information density. In such cases, a first part of a partial spectrum may cover the first area at least partially and a second part of said partial spectrum may cover the second area at least partially, while the lines of said first part may be extrapolated to said second part. In echelle spectra, for example, the optical intensity and hence the information density is typically higher towards the top and the middle of the spectrum (assuming the usual orientation of the spectrum), while the information density is typically lower towards the lower left and lower right corners. By extrapolating the fitted lines from the first, higher information density part into the second, lower information density part, it may still be possible to retrieve sufficient information from the second part of the spectrum. That is, peaks may still be located in the second part and their locations relative to their sections may be determined.

At least one partial spectrum may be located entirely in an area having a relatively low information density, such as the lower left and lower right areas in a typical echelle spectrum. Such a partial spectrum may be used for dark frame compensation, such as dark frame subtraction.

An optical spectrum may have been digitized in its entirety using a single exposure of a detector. Partial spectra may in that case be taken from the single original optical spectrum. In some embodiments, however, partial spectra may be obtained individually by separate partial exposures. Such partial exposures may or may not have the same exposure time. In some embodiments, therefore, at least some partial spectra have been digitized using different exposure times. That is, two or more partial spectra have been obtained using non-identical exposure times. The different exposure times may be based on a priori knowledge of the spectrum, such as the local intensity in a partial spectrum. A partial spectrum located in an area having a relatively low information density may have a longer exposure time than a partial spectrum in an area where the highest peaks are expected.

The method according to the invention may further comprise fitting together the lines fitted in the partial spectra so as to provide smooth lines. The lines fitted in the partial spectra can be boundaries and/or ridges of parts of sections. An adjacent partial spectrum may contain boundaries and/or ridges of the same sections. By fitting together these lines, the boundaries and/or ridges of the sections may be assembled from two or more partial spectra. In general, partial spectra may be fitted or "stitched" together, their features being fitted so as to provide smooth transitions between the partial spectra.

A line (that is, a boundary or a ridge) detected and/or fitted in a partial spectrum may be a substantially linear line. A line fitted in a partial spectrum may alternatively be a substantially curved line. Such a substantially curved line is preferably described by a polynomial. When using a polynomial or another mathematical function, it is possible to mathematically describe the lines constituting the borders and/or the ridges, thus allowing mathematical processing of the spectrum.

As mentioned above, the optical spectrum may comprise an echelle spectrum and the sections may comprise orders of the echelle spectrum. The method according to the invention may, for example, be used in analytical atomic spectrometry.

The invention also provides a method for detecting sections in two-dimensional optical spectra, the method comprising producing a template by using a method as described above. The method for detecting sections or bands in optical spectra may further comprise fitting an optical spectrum on the template. This may involve image adjustment by using known morphological operations such as shifting, rotating, projecting, stretching and shrinking the optical spectrum or the template, in at least one but preferably in two dimensions. The morphological operations may be controlled by minimizing the mean square error (MSE), that is, by minimizing the difference between the spectrum and the template. Fitting a spectrum on a template can be computationally simpler than detecting the sections of the individual spectrum, in particular when a sequence of similar spectra is processed. Such a method may further comprise matching sections of the optical spectrum with sections of the template.

In some embodiments, fitting the two-dimensional optical spectrum onto the template is carried out per partial spectrum. That is, each partial spectrum may be fitted onto the template separately. In some embodiments, the template is a template of the entire optical spectrum, while in other embodiments separate partial templates may be produced for at least some of the partial spectra. In some embodiments, a template of the entire optical spectrum may be used for one or more partial spectra only.

The present invention further provides a software program product for carrying out the method described above. The software program product may comprise a tangible carrier on which instruction are stored which allow a processor to carry out the method steps according to the invention. The tangible carrier may include a portable memory device such as a DVD or a USB stick, or a non-portable memory device, for example one that is part of the processing unit.

The present invention still further provides an optical spectrum processing device comprising a processor with an associated memory, wherein the processor is configured for carrying out the method as described above. In an embodiment, the optical spectrum processing device according to the invention further comprises a detector for digitizing the optical spectrum, such as a two-dimensional array detector.

The invention yet further provides an optical spectrography device, more in particular a spectrometer, comprising a light source for producing a two-dimensional optical spectrum and an optical spectrum processing device as described above.

DESCRIPTION OF EMBODIMENTS

Figure 1:
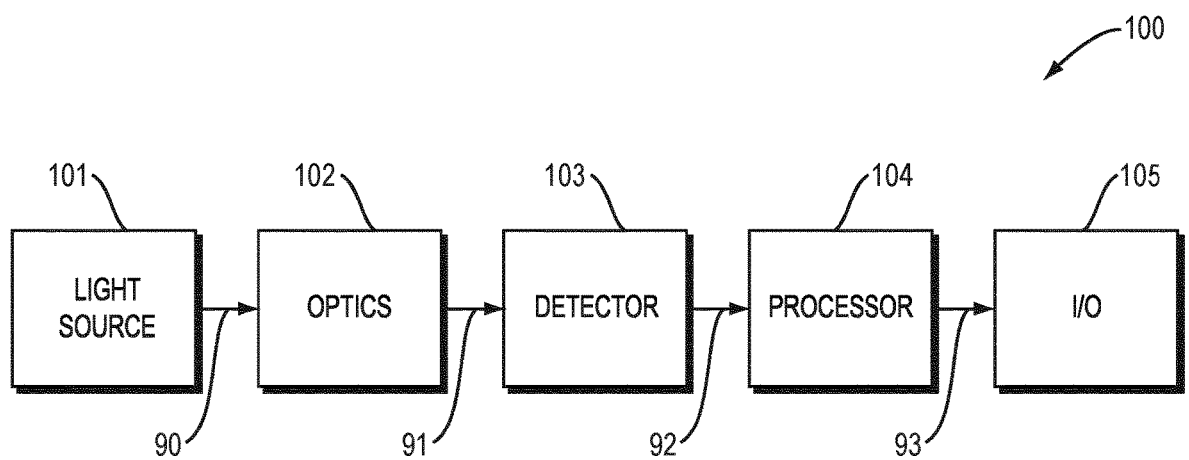
FIG. 1 schematically shows a device for spectrometry in which the invention can be utilized.

The present invention may be applied in the field of analytical atomic spectrometry, for example in the field of processing two-dimensional optical spectra (such as 2D echellograms) acquired by spectrometers used for chemical analysis. Such spectra may be produced by using echelle spectrometers which may be optical emission spectrometers or absorption spectrometers. Several sources may be used, such as ICP (Inductively Coupled Plasma), MIP (Microwave Induced Plasma) or other plasma, or other spectrum sources such as spark, arc, laser or flame sources. The spectra may be detected and digitized using a suitable detector, in particular an array detector, such as a CCD (Charge Coupled Device), CMOS (Complementary metal-oxide-semiconductor), CID (Charge Injection Device) or other type of array detector, although CID detector arrays are particularly suitable. A CID imaging arrangement is described in, for example, U.S. Pat. No. 8,018,514 (Thermo Fisher Scientific), the disclosure of which is incorporated herein by reference. Optical emission spectrometers are described in, for example, United States patent application US 2019/0107437 (Thermo Fisher Scientific), the disclosure of which is incorporated herein by reference.

The present invention seeks to provide a method and apparatus which allow processing a two-dimensional optical spectrum, such as an echelle spectrum, quickly and efficiently, thus making semi-real time or even real time processing possible. The present invention also seeks to provide a method and apparatus for processing a two-dimensional optical spectrum which can be fully automated, which are accurate and robust to noise and which can be applied under a wide range of experimental conditions. The invention facilitates fast automatic order and peak detection.

Exemplary embodiments of the invention may comprise some or all of the following steps:
  acquiring an image of an optical spectrum, such as a full frame image, using a detector, such as a two-dimensional array detector;

de-noising the acquired image by using a suitable algorithm, for example a total variation denoising (TVD) algorithm, where a suitable algorithm causes a minimal loss of accuracy;

selecting windows (that is, sub-images) in the acquired image;

determining local extrema (that is, minima and/or maxima) of the optical spectrum in the selected windows, which local extrema are indicative of the sections of the optical spectrum (that is, the orders in the case of echelle spectra);

determining series of adjacent local extrema;

applying a transform, such as a linear Hough transform, to each window to correct any outliers;

fitting polynomials through the determined series of adjacent local extrema in the respective windows so as to match the series of adjacent local extrema of adjacent windows, preferably while posing restrictions on the angles between the polynomials and the orientation of the detector;

identifying sections based upon the series of adjacent local extrema and/or the fitted polynomials;

determining peaks within the spectral sections;

storing data characterizing the peaks, such as their (absolute and/or relative) locations and/or their intensities.

Not all steps need to be carried out in the order presented above and not all steps need to be carried out. For example, the step of dividing the image into sub-images may be carried out before the step of denoising. This provides the advantage that the denoising may be made dependent on the properties of the particular sub-image. To provide another example, in some embodiments no polynomials may be used; instead, the properties (such as boundaries and/or courses) of the sections or bands being described in another way, for example by sets of boundary pixels. In some embodiments, sub-sampling may be carried out to determine the locations of the local extrema and hence the courses of the sections of the optical spectrum with a greater accuracy. Sub-sampling also allows the locations of peaks to be determined with greater accuracy.

In some embodiments, the steps outlined above may be applied on each image of an optical spectrum. In other embodiments, some of the above steps may be applied on one or more sample spectra to form a template, which template may be used to more efficiently process subsequent spectra. Some steps, such as denoising, may be conditional on a step in which it is determined whether denoising is required. Some steps may be carried out in a different order, for example denoising and selecting windows.

The method and apparatus of the invention may be used for wavelength calibration, diagnostics, troubleshooting and analytical measurements. The invention can be used in both absorption and emission spectroscopy.

An exemplary embodiment of a device in which the invention can be utilized is illustrated in FIG. 1. The spectroscopy device 100 schematically illustrated in FIG. 1 comprises a light source unit 101, an optics unit 102, a detector unit 103, a processing unit 104 and an input/output (I/O) unit 105. The light source unit 101 may for example comprise a discharge lamp and a sample which absorbs certain wavelengths, the resulting light of which is to be analyzed. To this end, the light 90 produced by the light source unit 101 is fed to the optics unit 102 which can contain an echelle grating and a prism to produce an echelle spectrum. The light source unit 101 may alternatively, or additionally, comprise an ICP (inductively coupled plasma) torch.

The optics unit 102 may contain further optical elements, such as one or more mirrors and/or one or more lenses. The light 91 emerging from the optics unit 102 is projected on an array detector 103 where it is detected and converted into an electrical signal 92 representing the optical spectrum. The array detector 103 may comprise a CID (Charge Injection Device) array, for example. The electrical signal 92 is fed to the processing unit 104, which can contain a microprocessor and an associated memory. The memory can store instructions allowing the processor to carry out method steps according to the present invention. The processing unit 104 uses the electrical signal 92 to produce information relating to the echelle spectrum, for example information relating to the position and/or intensities of peaks in the echelle spectrum. This information may be displayed and/or printed by the I/O unit, which may also forward this information to other devices.

Figure 2:
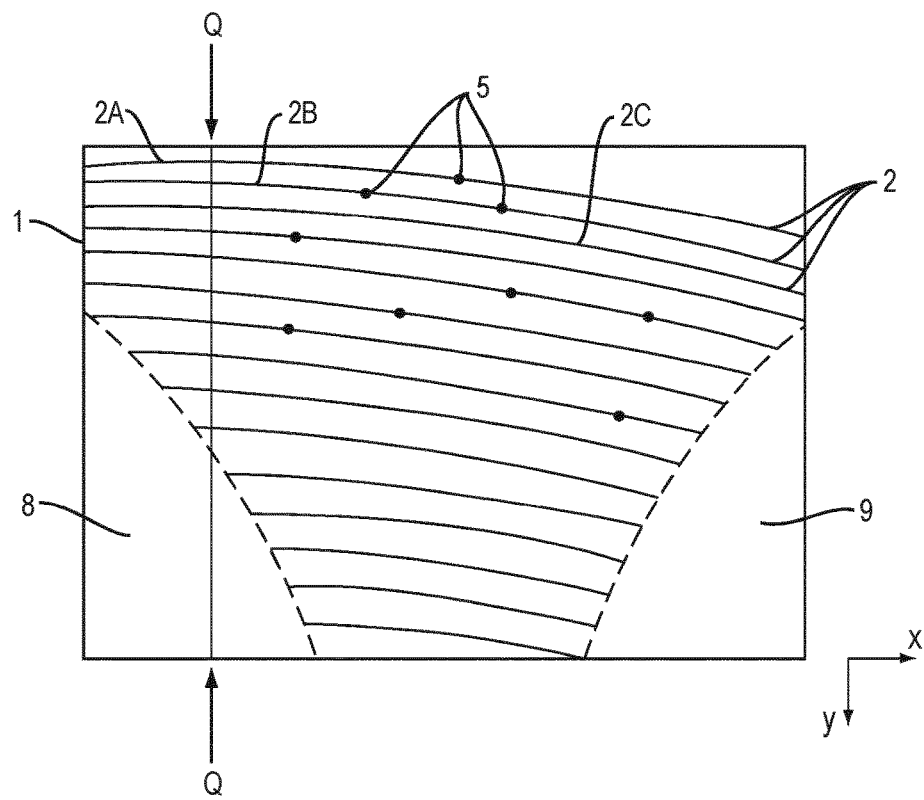
FIG. 2 schematically shows an echellogram as may be used in the method of the invention.

An exemplary echelle spectrum is schematically illustrated in FIG. 2. The echelle spectrum 1 is shown to comprise orders 2. The orders 2 extend substantially in parallel and approximately horizontally in FIG. 2. The orders 2 can be curved, so that the angle between an order and the x-axis can vary in dependence on the x-position. The orders 2 are also shown to contain peaks 5, of which only a small number is shown by way of example in FIG. 2. The orders 2 are represented in FIG. 2 by their center lines or ridges, but in practice orders have a certain width and can be considered sections of the two-dimensional spectrum 1. Areas 8 and 9 have a low information density as the intensity of the orders and their respective peaks is very low in those areas. The highest intensities are mostly found near the top of the echellogram 1.

The peaks 5, which can be characterized as (local) maxima of the orders, are indicative of the light source. That is, the chemical elements present in the light source cause specific peaks to appear in the echelle spectrum, thus allowing the chemical elements to be recognized based on the spectrum.

Figure 3:
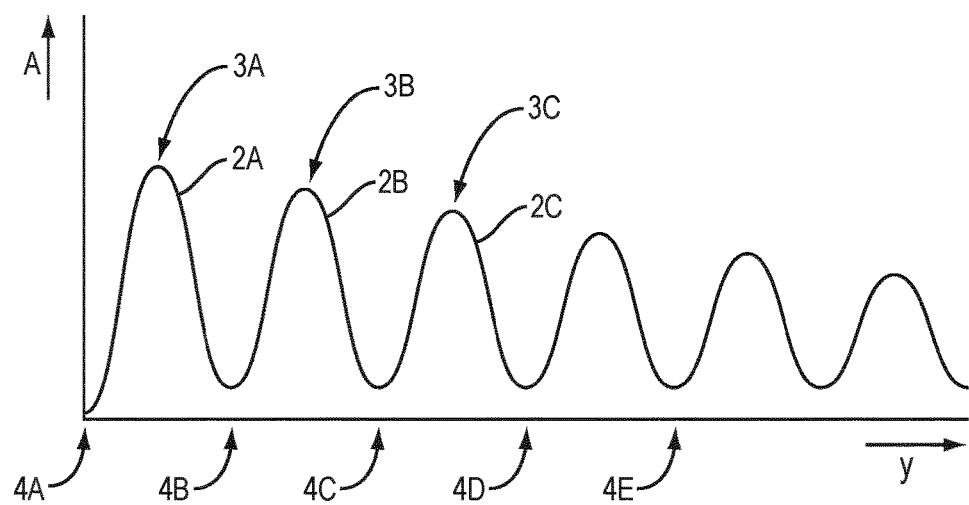
FIG. 3 schematically shows a series of orders of the echellogram of FIG. 2.

An example of orders is shown in more detail in FIG. 3, which can be part of a cross-section of the echelle spectrum 1 of FIG. 2 along the line Q.-Q. and hence a cross-sections of the orders 2 along a column of the array detector with which the spectrum is detected. It will be understood that in FIG. 3 the orders extend perpendicularly to the plane of the drawing (compare FIG. 2).

The order 2A is shown to have the highest intensity or amplitude A, this is the topmost order in the example of FIG. 2. It can be seen that the amplitude A of the orders gradually decreases, order 2A having a larger amplitude than order 2B, order 2B having a larger amplitude than order 2C, etc. Although this is typical, it is not necessarily always the case that subsequent orders have a smaller amplitude.

The first order 2A is shown in FIG. 3 to have a maximum 3A and to be delimited by local minima 4A and 4B. Similarly, the second order 2B is shown to have a (local) maximum 3B and to be delimited by local minima 4B and 4C. Thus, each order can be said to constitute a band or section of the spectrum (1 in FIG. 2) having a width defined by the local minima (such as 4B and 4C). The amplitude A of the spectrum at a local minimum 4A, 4B, etc. may be greater than zero or equal to zero.

It can be seen in FIG. 3 that the orders can be identified by either detecting two subsequent local minima, such as 4B and 4C, or detecting a local maximum, such as 3B, or both. The local minima and maxima are here local extrema when the spectrum is viewed in the Y-direction, that is, in the vertical direction. If the spectrum of FIG. 2 is captured by a two-dimensional detector array, for example, the line Q.-Q in FIG. 2 can be said to represent a column of pixels. Thus, the local extrema of FIG. 3 are, in the present example, local extrema per array column. It will be understood that alternatively, or additionally, local extrema per array row may be determined. However, due to the essentially horizontal orientation of the orders 2 in the example of FIG. 2, determining local extrema per array column can be more efficient.

Figure 4:
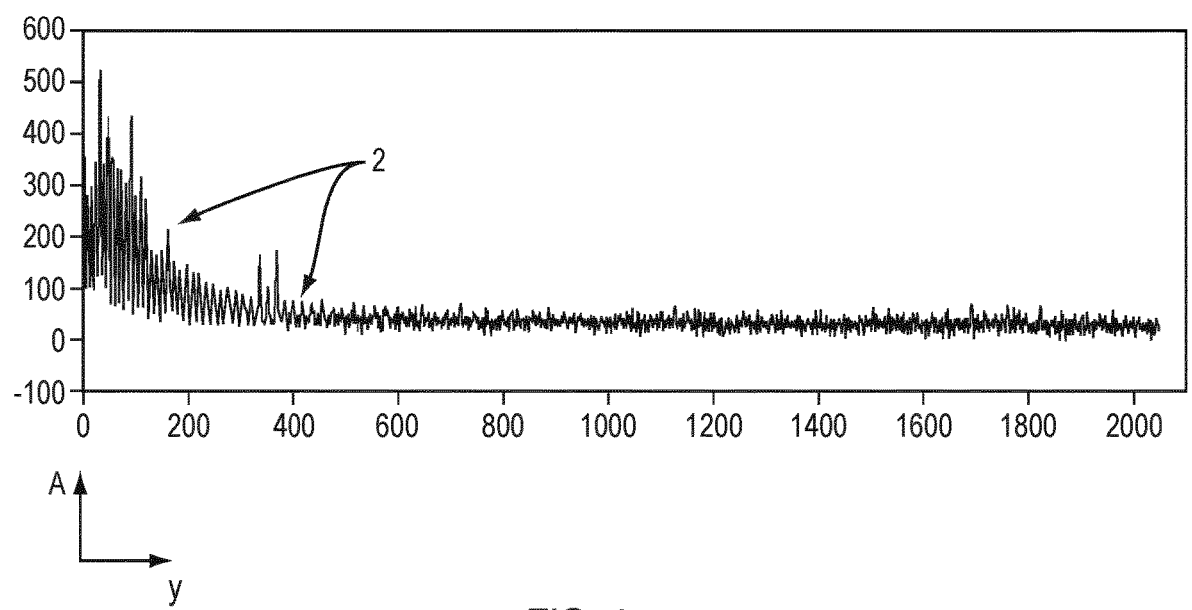
FIG. 4 schematically shows a series of orders of an echellogram in the presence of noise.

In practice, the orders normally cannot easily be distinguished, as a typical echelle spectrum will contain noise. This noise may be introduced by the light source, by the optics and/or by the array detector. FIG. 4 provides an example of an actual cross-section of an echelle spectrum showing a large number of orders. As can be seen, the noise makes it difficult to distinguish the orders, in particular those orders having a lower amplitude and hence a lower signal-to-noise ratio. The noise makes it especially difficult to detect peaks of the orders and to determine their locations.

In order to reduce the influence of noise, the present invention uses denoising, preferably total variation denoising (TVD). As opposed to smoothing, which leads to the loss of image detail, denoising attempts to preserve the image detail while reducing noise. TVD techniques are described in, for example, the above-mentioned paper by Rudin, Osher & Fatemi.

The denoising may be applied to the entire image or only to selected sub-images or windows. That is, within the image of the spectrum, sub-images may be defined, each having substantially less pixels than the full image. The full image may for example be divided into 4 (or less) to 16 (or more, such as 32) sub-images, which together constitute the full image. Alternatively, from the full image between 4 (or less) to 16 (or more) sub-images may be selected, which together contain less pixels than the full image. Thus, image areas of less interest can be excluded from processing. In some embodiments, the sub-images may together cover less than the entire spectrum image 1, for example less than 90%, less than 50% or less than 25%.

Figure 5:
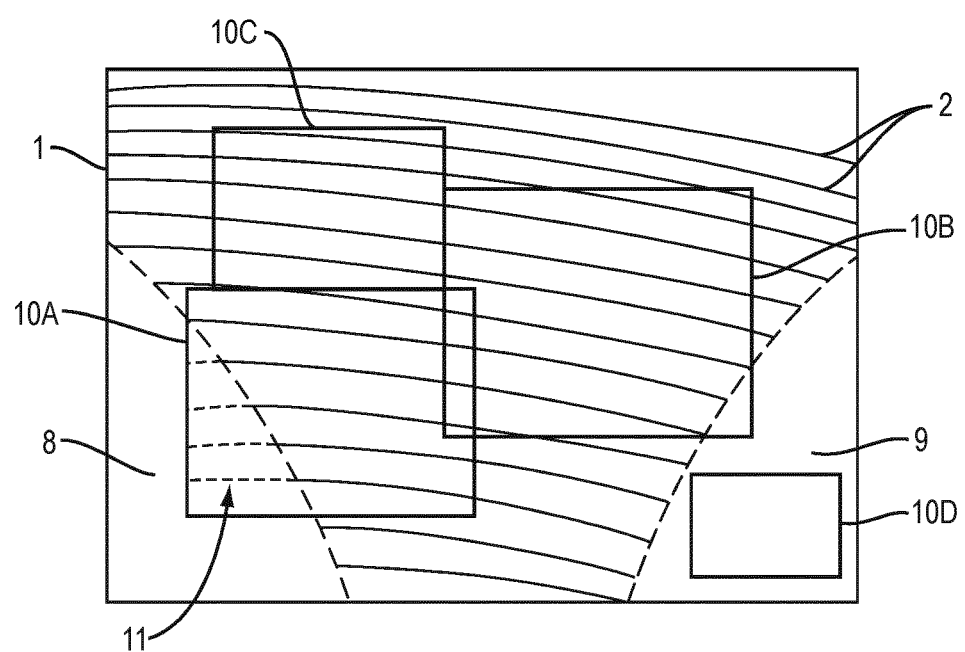
FIG. 5 schematically shows the use of windows to analyze a two-dimensional spectrum.

An example of the use of sub-images or windows is schematically illustrated in FIG. 5. The image 1 is shown to comprise four sub-images or windows 10A, 10B, 10C and 10D, which together cover only part of the full spectrum 1. Each sub-image or window contains a partial spectrum.

In the example shown, there is an area of overlap between the windows 10A and 10B, while there is no overlap between window 10C and the other windows. The windows 10A, 10B and 10C may be selected on the basis of prior knowledge and may for example be selected in such a way that they contain certain expected peaks. Window 10D is selected in such a way that covers a part of the spectrum with a lower information density, in this case the lower information density area 9. Such a window may not be used for identifying peaks, as identifiable peaks may be absent from the area 9, but for determining background noise. The window 10D may thus be used for dark frame compensation.

As can be seen in FIG. 5, window 10A partly covers the area 8 having a lower information density. In this lower information density area 8, as in the area 9, it is difficult to correctly determine the characteristics of the sections of the spectrum. According to a further aspect of the invention, the part 11 of the sub-image 10A which covers the area 8 may not be used for determining the characteristics of the spectrum. Instead, the remainder of the window 10A may be used and the results may be extrapolated to the part 11. That is, the spectrum characteristics in the part 11 of the window covering the low information density area (8 in the present example) may be obtained by extrapolation from the remainder of the window. In this way, the areas 8 and 9 of the spectrum may still be used, at least partially. Extrapolation of the series of local extrema or of lines connecting the local extrema may be carried out using known methods.

As mentioned above, denoising may be carried out per window (sub-image). This allows the denoising to be adapted to the properties of the particular window. In addition, it may reduce the total amount of denoising processing required if the windows together cover less than the full spectrum.

Once the spectrum has been denoised, its characteristics may be determined. To this end, the method of the invention determines local maxima and/or minima of the spectrum. Referring again to FIG. 3, the method may determine the location of the minima 4A, 4B, 4C, etc. on, in this example, a column of pixels. Thus, the method may determine the borders between the sections of the image (the sections being orders in the case of echelle spectra). Each pair of borders defines a section between them. Alternatively, or additionally, local maxima 3A, 3B, etc. may be determined, thus producing the ridges or approximate mid-lines of the sections. Either a pair of borders or a ridge may be used to define a section (2 in FIG. 2) of the spectrum. In some embodiments, both a pair of borders and a ridge may be used.

When determining the local minima and/or maxima to find the borders and/or ridges of the sections, the resulting sets of extrema will not form smooth lines. The detected locations of the extrema may be influenced by residual noise and the spacing of the pixels. It is noted that the word "lines" is used here to denote strings of detected local extrema, which are indicative of section boundaries and/or detected section ridges.

In order to reduce the influence of any noise and to smoothen the boundaries and/or ridges, the present invention proposes to use a transform and to smoothen the series of extrema (which effectively constitute lines) that were found by detecting the locations of extrema in the transform space. The invention preferably uses a transform which is based on polar coordinates. A preferred transform is the Hough transform, although other transforms may also be used.

The Hough transform is described in the original Hough U.S. Pat. No. 3,069,654 mentioned above, and for example in R. O. Duda and P. E. Hart, "Use of the Hough Transformation to Detect Lines and Curves in Pictures," Comm. ACM, Vol. 15, pp. 11-15 (January 1972).

Applying the transform may comprise removing outliers in the transform domain. Outliers may be due to noise and/or measurement errors. By removing outliers, the lines defining the sections can be improved. It has been found that removing outliers in the transform domain is more effective than in the original domain. In particular, the Hough transform describes points in a plane as a combination of a distance and an angle, the distance being the distance from the origin and the angle being the incline of the order at that particular point. It has been found that outliers typically have an angle which is incorrect. The method of the invention may either remove such outliers or correct the angle by replacing the detected incorrect angle with an average angle, for example. In addition to correcting or removing outliers, the angle may be smoothened. After correcting outliers and/or smoothening the angles, the inverse transform may be carried out to bring the data points back to the original domain.

Before applying a transform, edge detection may be carried out to better identify edges of the image sections. Edge detection may be carried out using conventional techniques, such as the Canny edge detection algorithm as described in J. Canny, "A Computational Approach to Edge Detection", IEEE Transactions on Pattern Analysis and Machine Intelligence, 8(6):679-698, 1986. Other edge detection algorithms may be used instead.

As mentioned above, the image may be processed per sub-image or window. That is, the transform and/or edge detection may also be carried out per sub-image. After the inverse transform and any edge detection, the windows may be stitched together to constitute a composite image. The stitching together, which should ensure that the detected sections are continuous and have smooth borders, may be carried out using known techniques. An example of image stitching techniques is disclosed in Steve Mann, "Compositing Multiple Pictures of the Same Scene", Proceedings of the 46th Annual Imaging Science & Technology Conference, May 9-14, Cambridge, Massachusetts, 1993. Again, the stitching should ensure that the lines denoting the borders or the ridges of the sections are uninterrupted and smooth, having no corners.

The spectrum image resulting from stitching or from inverse transforming and/or edge detecting has associated lines representing the borders and/or ridges of the sections of the spectrum. Those lines may be fitted on the (original or denoised) spectrum. Subsequently, peaks may be detected and be associated with an order. Peaks of the spectrum may be detected using any suitable algorithm, for example detecting local maxima along a section. A threshold may be applied to limit the number of detected peaks and to eliminate smaller peaks.

Of each detected peak exceeding the threshold (if any), the following data may be recorded:
the order in which the peak was detected;
the relative position of the peak within the order; and
the intensity (the height and/or width) of the peak.

The present invention may thus be used to detect the sections (or orders in the case of echelle spectra) and hence to determine the position of peaks relative to their respective sections.

The lines representing the borders and/or ridges of the sections of the spectrum may be determined for each spectrum image individually. However, in some embodiments, the set of lines thus obtained may be used for several spectra, for instance for a number of subsequent similar spectra. This saves the computational effort of determining the lines representing the borders and ridges for each spectrum individually. Thus, the lines determined for one spectrum may be used as a template for a series of spectra.

Figure 6:
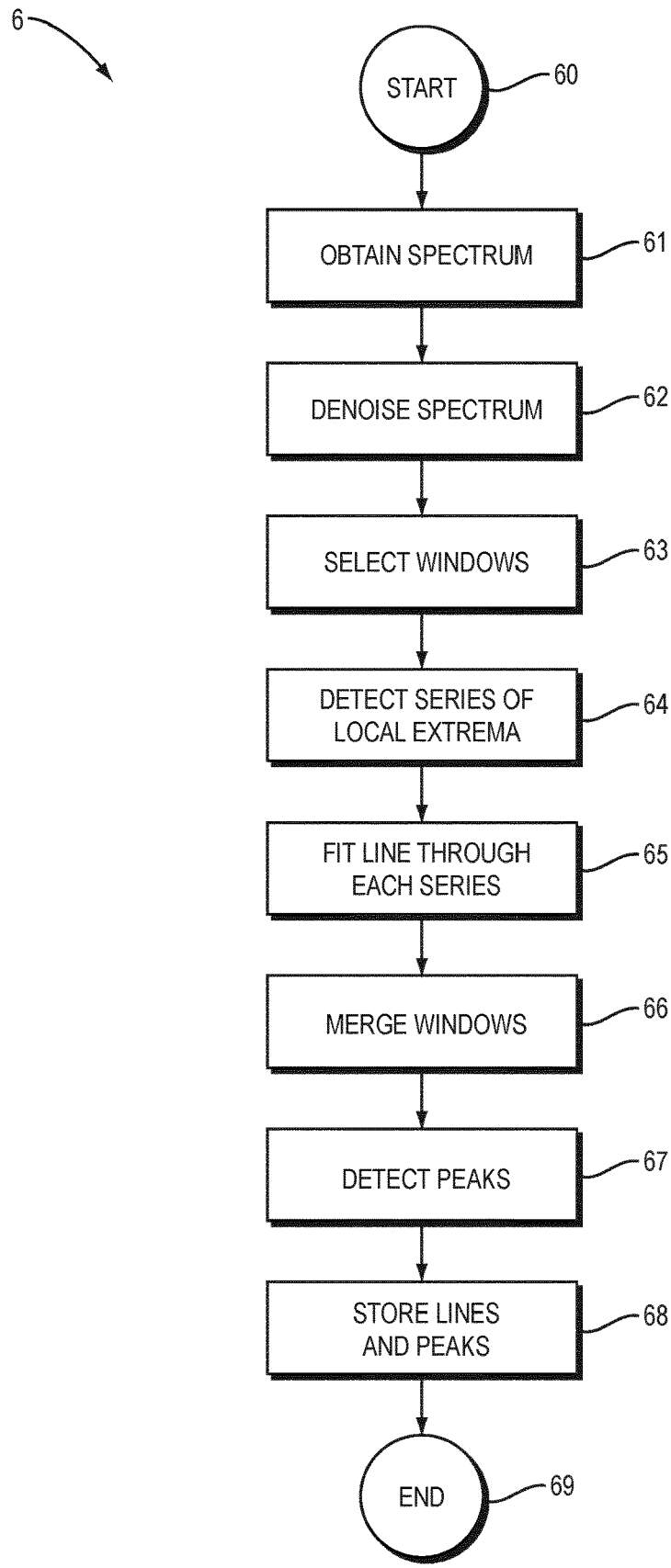
FIG. 6 schematically shows a first embodiment of a method according to the invention.

A first embodiment of a method according to the invention is schematically represented in FIG. 6. The method 6 illustrated in FIG. 6 starts at 60. In step 61, a two-dimensional optical spectrum is obtained, for example by capturing the spectrum using a two-dimensional array detector, or by retrieving a previously captured spectrum from memory.

In step 62, the optical spectrum is denoised, preferably using total variation denoising. The result of step 62 is a denoised two-dimensional optical spectrum. In this embodiment, partial spectra or windows are used to process only the parts of interest of the optical spectrum. To this end, one or more windows are selected in step 63. Within each window, a series of neighboring local extrema is detected in step 64. In step 65, a line is fitted through each series of neighboring local extrema, for example by using polynomials. The step of fitting lines may further comprise using feature detection, for example by using the Hough transform.

Step 65 may contain the following sub-steps:
transforming a string of extrema,
correcting any outliers to produce a corrected string, and
inversely transforming the string of extrema.

In step 66, the windows are merged where necessary, that is, where the windows share a boundary or overlap. Merging windows may involve fitting the lines of the windows together and optionally adjusting those lines when their angles and/or curvatures do not correspond. Adjusting may involve fitting a new line which best approximate two corresponding lines from two windows, under the restraint of a maximum angle at their junction and/or of a maximum curvature. A smoothening algorithm may be applied is this instance.

The lines may be used to delineate the sections of the spectrum and to detect peaks within each section in step 67. The peak data of each peak, such as each relative position and/or intensity, may be stored in step 68, together with the data describing the fitted (and, where appropriate, adjusted) lines. The method ends in step 69. It will be understood that this embodiment is exemplary only and that many modifications and additions may be made within the scope of the invention.

Figure 7:
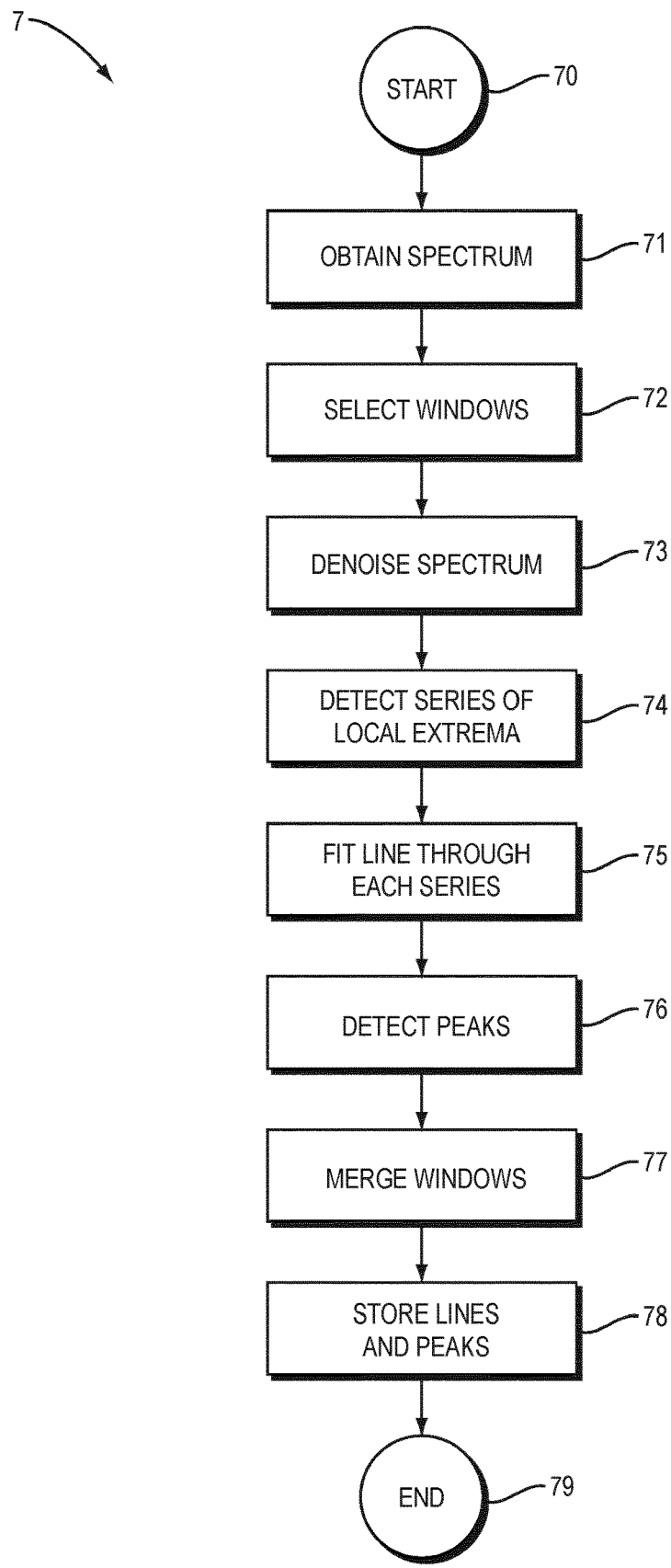
FIG. 7 schematically shows a second embodiment of a method according to the invention.

A second embodiment of a method according to the invention is schematically shown in FIG. 7. The method 7 of FIG. 7 is essentially similar to the method 6 of FIG. 6, but some steps are carried out in a different order. The method 7 starts at 70 and then obtains a spectrum in step 71, as in step 61 in FIG. 6. In contrast to the method 6, the method 7 first selects windows in step 72 and then denoises the spectrum in step 73 by denoising the partial spectra of the selected windows. By only denoising the partial spectra, typically less spectrum image data will have to be processed, thus saving resources. It is noted that in at least some partial spectra denoising may not be carried out if the noise level is sufficiently low, thus also saving resources.

The method continues with step 74 where series of local extrema in the partial spectra (windows) are detected and step 75 where one or more lines are fitted through the series of local extrema. If the windows are small enough, a single straight line may be fitted through at least some of the series. That is, in some windows one of more of the series of local extrema, which series are normally curved, may be approximated by a single straight line.

In contrast to the method 6 of FIG. 6, in the method 7 peaks are detected before the windows are merged. In step 76 peaks are detected, for example by finding a local intensity maximum on each of the straight lines determined in step 75. In the method 7, this may be done per window. Then, in step 77, the windows may be merged. In some embodiments, this may comprise producing a composite image from the windows by "stitching together" the windows, but in other embodiments no actual composite image is produced, but the positions of the peaks relative to the windows may be converted into positions relative to the whole image. The fitted lines and/or the peaks may be stored in step 78, after which the method ends at 79.

The methods 6 and 7 may be applied to process optical spectrum images individually or sequentially. In the latter case, the method may not end after steps 68 or 78 but may return to step 61 or 71. The methods may also be used to determine a template for later matching with optical spectrum images.

Figure 9:
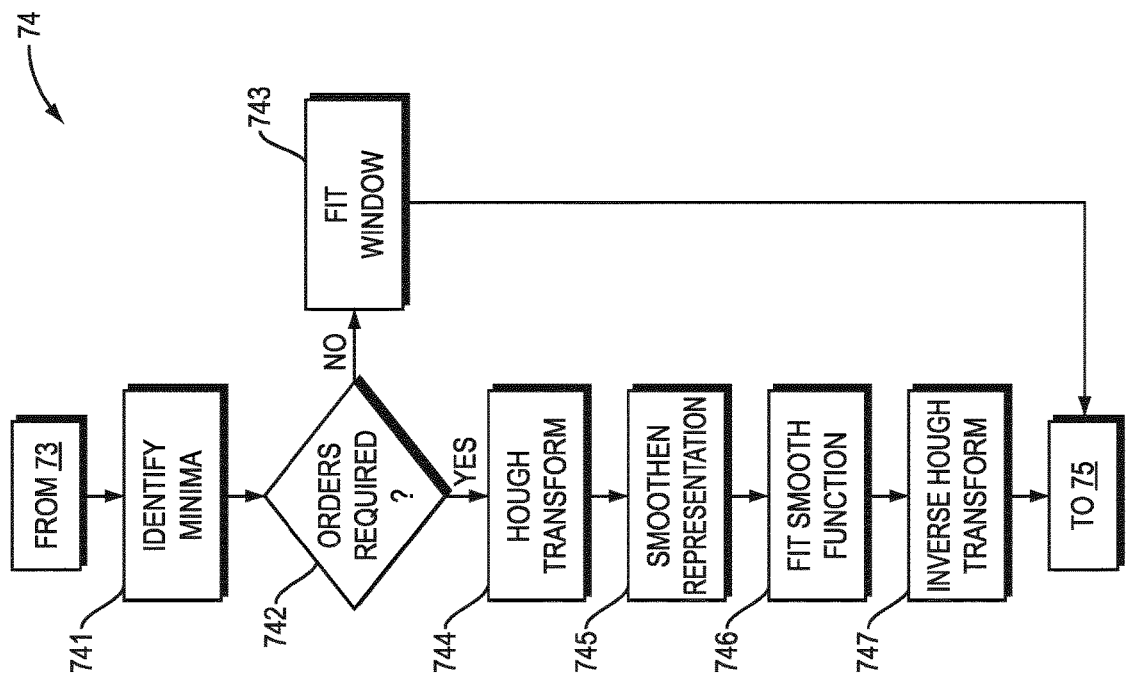
FIG. 9 schematically shows further sub-steps of the method of FIG. 7.
Figure 8:
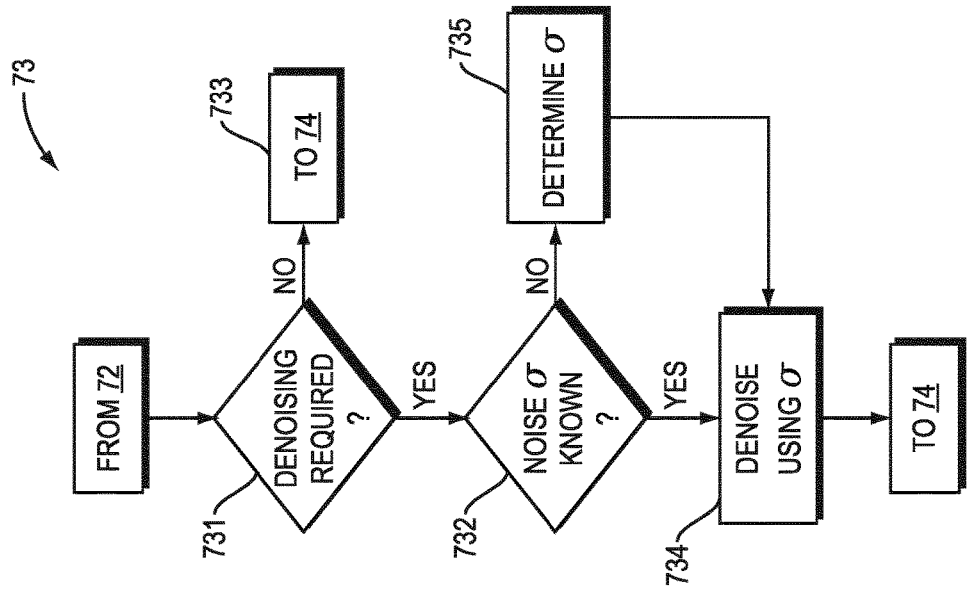
FIG. 8 schematically shows sub-steps of the method of FIG. 7.

Embodiments of steps 73 and 74 of the method 7 are shown in more detail in FIGS. 8 and 9 (it is noted that these embodiments may also apply to the corresponding steps 62 and 64 of FIG. 6). The step 73 of FIG. 8 starts with determining whether denoising is required in sub-step 731. This may be done on the basis of a priori knowledge, or on the basis of a test, or both. It may be known beforehand that a particular optical spectrum image or window contains little noise, or that the particular window contains no relevant peaks. This may in particular be the case when first a template is made and the processing of further optical spectrum images mainly consists of fitting the template to the image. In that case the locations of the sections (e.g. orders in Echelle spectra) are known and only the location of the peaks may be determined, which may be feasible in the presence of noise. When determining whether denoising is required is based upon a test, the noise level may be determined using any suitable method. An example of a suitable method is Fourier transforming the image signal and evaluating the variance of the resulting spectrum at high frequencies, for example at frequencies around half the sampling frequency.

The determined noise level may be compared with one or two threshold values. If the noise level is too high, for example above a threshold value of SNR (signal-to-noise ratio)=1, then denoising is hardly useful (in some embodiments, the method may then end or return to step 61 or 71). If the noise level is too low, for example below a threshold value of SNR=1000, or SNR=500, then denoising is not necessary.

If the outcome of sub-step 731 is that denoising is required, then the method continues with sub-step 732, else the method continues with step 74. In sub-step 732, it is determined whether the standard deviation σ of the noise is known. Noise properties may be known a priori or may be determined in sub-step 735 using a suitable method, for example the above-mentioned Fourier transform method. Then, in sub-step 734, the optical spectrum image or a part (window) of the optical spectrum image is denoised using a suitable denoising method, such as TVD (total variation denoising), for example using the Rudin-Osher-Fatemi model. In accordance with the invention, smoothing by averaging is preferably avoided. In sub-step 734, the noise parameter σ and any other noise parameters determined in sub-step 735 or known a priori can be used. After sub-step 734, the method proceeds with step 74.

An embodiment of step 74 is shown in more detail in FIG. 9. In this embodiment, step 74 starts with sub-step 741, in which minima (in general: extrema) are identified in the optical spectrum image, or in the particular window being processed. Minima may be identified by comparing pixel values (that is, image intensity values) with a set of neighboring pixels, as is well known. In sub-step 742, it is determined whether identifying orders (or, more generally, image sections) is required. As in some applications use is made of a previously prepared template, the orders and their expected locations have already been identified. In that case, the method proceeds with sub-step 743, in which the window, or the entire image, is fitted onto the template by rotating, scaling, projecting and/or other image processing operations. When sub-step 743 is completed, the method continues with step 75.

If the outcome of sub-step 742 is that the determination of the orders (or sections) is required, then in sub-step 744 a transform is used, such as the Hough transform, to better identify the order boundaries (or section boundaries). As the Hough representation can be noisy, in step 745 the transform representation is smoothened or denoised in sub-step 745. For example, outliers may be removed and/or the denoising algorithm may be applied. In this particular instance, a form of averaging may also be applied. Then, in sub-step 746, a smooth function is fitted onto the smoothened representation of the minima. A smooth function may comprise straight lines or straight line sections, and/or parabolic lines and/or other smooth lines. Thus, the transformed minima can effectively be replaced by the values of the fitted smooth function. Then, in sub-step 747, the inverse transform is applied, after which the method continues with step 75.

The present invention has been described in the above without using mathematics. Some aspects of the invention may be described effectively in mathematical terms, as explained below.

Noise Removal: General

The two-dimensional spectrum can be generated by a certain analyte, the properties of which are to be determined. The following model may be used:

$$s=u+w,\qquad(1)$$

where s is an observed experimental measurement and u is the signal generated by an analyte, which signal is corrupted by noise w. Here the signal u is assumed sparse (or at least its representation in some basis), whereas the noise w is always assumed dense. The problem of denoising turns into that of the recovery of a sparse signal u (or its representation in some basis) from an observed dense signal s, which can be stated as $$\min_u\left[\|H(s-Au)\|_2^2 + \sum_i \lambda_i \|F_i(u)\|_{p_i}\right],\qquad(2)$$

where H and A are matrices reflecting some properties of s and u (e.g. anisotropy, texture, etc.), $\|H(s-Au)\|_2$ is an $L_2$-norm (Euclidean norm), $i\in\mathbb{N}$, $\lambda_i$ are regularization parameters, $\forall p_i \in [0,1]$, $F_i(u)$ is a linear transformation of u, while $\Sigma_i$ denotes here the sum over all i. Note that in the problem stated in the equation 2, u doesn't necessarily have to be sparse as long as $F_i(u)$ are (vide infra). The first term in equation 2 minimizes the discrepancy between the observation s and the sought signal Au, in the sense of an $L_2$-norm, whereas the second is the set of constrains that insure the sparseness of $F_i(u)$'s and u in the sense of an $L_p$-norm. Although in most cases the problem stated in eq. 2 does not have an analytical solution, there is a plethora of fast and efficient iterative approaches to solve it, which approaches are well known in the art:

L. Condat, "A direct algorithm for 1-D total variation denoising", IEEE Signal Processing Letters, 20(11):1054-1057, November 2013.

M. Figueiredo, J. Bioucas-Dias, and R. Nowak, "Majorization-minimization algorithms for wavelet-based image restoration", IEEE Trans. Image Process., 16(12):2980-2991, December 2007.

M. V. Afonso, J. M. Bioucas-Dias, and M. A. T. Figueiredo, "Fast image recovery using variable splitting and constrained optimization", IEEE Trans. Image Process., 19(9):2345-2356, September 2010.

T. Goldstein and S. Osher, "The split Bregman method for L1-regularized problems", SIAM J. Imag. Sci., 2(2):323-343, 2009.

C. Wu and X. Tai, "Augmented Lagrangian method, dual methods, and split Bregman iteration for ROF, vectorial TV, and high order models", SIAM J. Imag. Sci., 3(3): 300-339, 2010.

Since it is not feasible to recover the signal u from the observation s beyond the uncertainty imposed by noise w (eq. 1), the values of the regularization parameters $\lambda_i$ (eq. 2) should reflect properties of the noise w specific to the experimental technique.

A 3D representation of the orders in echelle spectra has a form of horizontal quasi-parallel ridges with the groove-like borders separating them. The problem of identifying each individual order then can be recast into that of detecting either ridges or grooves (or a combination of both). The latter can be solved in two steps: by first detecting continuous stretches of local minima (or maxima) followed by the fitting of smooth lines through the found sections.

It may be beneficial in the detection of extrema to employ a method of edge detection. Many of such methods are well known in the art and not discussed further here.

Since the orders in echelle spectra are well characterizable, it is beneficial, in the step involving fitting smooth lines through the detected extrema, to use a method of feature extraction, such as a Hough transform. A particular advantage of this method is that it is feasible to decompose any signal into a set of features which have analytical expressions, e.g. straight lines, polynomials, etc.

Once a two-dimensional spectrum is segmented into a multiplicity of sections or bands, peak characterization can be accomplished by any method of peak detection.

Noise Removal: Considerations on Practical Implementations a. Choice of the Operators 'H' and 'A'

A choice of the matrix A is primarily dictated by the specific properties of the analyzed data and the desired outcomes of the processing. Therefore, it may be beneficial, for the purposes of the signal extraction from speckle noise, to use A=I, where I is the identity operator. Linear transformations in the first term of eq. 2 can also be used in such a way as to filter out some undesirable but characteristic features of s specific to the experimental technique. In particular, echellograms are known to have blob-like baselines, whose frequency domain signatures differ substantially from those generated by orders and lines alone. Therefore, it may be beneficial to select a matrix H which acts as a high-pass filter, making all the low frequency components of s (representative of the base line) irrelevant in the context of the minimization procedure, which effectively removes the baseline from u. A detailed description of the method of construction of such filters can be found elsewhere (for example in I. W. Selesnick, H. L. Graber, D. S. Pfeil, and R. L. Barbour, "Simultaneous low-pass filtering and total variation denoising," *IEEE Transactions on Signal Processing*, vol. 62, pp. 1109-1124, 2014). Otherwise, one can set H=I, which delegates the baseline subtraction from u to the following steps in the echellogram processing.

Alternatively, linear transformations can be used to enhance informative features of the original signal s in u. For instance, given the quasi-parallel nature of the orders in echelle spectra, it may be beneficial to accentuate their directional features with As that function as anisotropic convolution operators during the denoising procedure. The methods of construction and applications of such operators are well known in the art (P. Perona and J. Malik. "Scale-space and edge detection using anisotropic diffusion." IEEE® Transactions on Pattern Analysis and Machine Intelligence. Vol. 12, No. 7, July 1990, pp. 629-639).

b. Choice of the Sparse Representation(s) '$F_i(u)$'

For the solution of eq. 2 to exist and be practically attainable u itself does not necessarily have to be sparse, it is sufficient to find a non-empty set of its linear transformations $F_i(u)$, where each individual $F_i(u)$ is sparse. Any echelle spectrum intrinsically contains a finite number of both orders and lines (i.e. finite number of extrema) and can be assumed to be piecewise flat even without prior removal of the baseline (vide supra). By their design echelle grating are most often used between orders 20 to 200. It is guaranteed that the first K (partial) derivatives of u are sparse. Therefore, it is beneficial to use $$F_i(u)=D_i u, \quad (3)$$

where $D_i$ is the $i^{th}$ order derivative operator. Incorporating eq. 3 into eq. 2 results in $$\min_u \left[ \|H(s - Au)\|_2^2 + \sum_i \lambda_i \|D_i u\|_{p_i} \right]. \quad (4)$$

The orders in echelle spectra have specific orientation(s) in the XY-plane; therefore, it may be beneficial to weigh and estimate the sparseness in both directions separately. That can be accomplished by restating the minimization problem (eq. 4) as $$\min_u \left[ \|H(s - Au)\|_2^2 + \sum_i \left( \lambda_i^x \|\nabla_i^x u\|_{p_i} + \lambda_i^y \|\nabla_i^y u\|_{p_i} \right) \right], \quad (5)$$

where $\nabla_i^x$ and $\nabla_i^y$ are partial $i^{th}$ order derivative operators with their respective regularization parameters $\lambda_i^x$ and $\lambda_i^y$ split in x and y directions. Note that the incline of the orders in echelle spectra can be known a priori. The incline of the echelle orders can be calculated by using the dispersion of the cross-dispersion element, i.e. a grating or a prism. It may be beneficial to scale $\lambda_i^x$ and $\lambda_i^y$ accordingly, e.g.

$$\lambda^x = \lambda f_x(\varphi), \text{ and} \quad (6.a)$$

$$\lambda^y = \lambda f_y(\varphi), \quad (6.b)$$

where $\varphi$ is the incline of the order(s), and $f_x$ and $f_y$ are the scaling functions.

c. The Value of the Regularization Parameter(s) '$\lambda_i$'

The signal u can be reconstructed from an observation s with the uncertainty imposed by the noise, therefore $\lambda$ is always a function of the noise w. It may therefore be advantageous to use $\lambda = \alpha \sigma_w$, where $\sigma_w$ is the standard deviation of the of w, and a is the scaling parameter determining the tradeoff between false positives and false negatives. Since the informational content as well as the noise characteristic of echelle spectra are spatially and directionally nonhomogeneous, it may be beneficial for the value of a to be position (and gradient) dependent.

d. Characterizing the Noise 'w'.

One characteristic feature of echelle spectra is the skewed power distribution of its frequency representation. Most of the signal is concentrated in the low frequency range (i.e. «½ Nyquist frequency). In contrast, the noise is always dense, both in the frequency and the time domain. Therefore, it can be advantageous to Fourier transform the observable signal s followed by the evaluation of its variance in the high frequency ranges to get an estimate of the $\sigma_w$. If the frequency response of the detector is known, that information may be used to enhance the fidelity of that estimation. Given the intrinsic directionality of echelle spectra, it may be advantageous to perform that procedure in x and y directions independently.

Given the spatial non-homogeneity of echelle spectra, it may be advantageous to perform the above described procedures (or any combination of thereof) in a windowed approach, either covering the entire optical spectrum (e.g. echellogram), or only covering selected areas of interest.

Segmentation of an Echellogram into Individual Orders: Considerations on Practical Implementations The orders in echelle spectra have intrinsic inclines and curvatures and can be well approximated by polynomials of orders 1. Since their approximate ranges can be known a priori, substantial gains in speed and fidelity can be achieved by reducing the search space of the polynomial coefficients reflective of those values.

Since all the echellogram parameters (e.g. noise characteristics, directionality, etc.) are spatially non-uniform, substantial gains in fidelity can be achieved if processing is carried on selected windows (that is, sub-arrays) of interest, where these parameters can be evaluated locally with much greater precision. Furthermore, since echellogram orders can be approximated by lower degree polynomials without loss of precision, substantial gains can be achieved in processing speed as well.

If the window of interest is large enough, it may be beneficial to further subdivide it into a multiplicity of (possibly overlapping) sub-windows (which may also be referred to as sub-sub-arrays). Hence, the orders in the original window can be reconstructed from those found in a multiplicity of sub-windows via any curve fitting method known in the art. Note that this approach can be extended to processing of echellograms in their entirety.

The size, the position, and the multiplicity of the windows are primarily driven by uniformity/spatial characteristics of the noise and available computational resources, however there are a several practical considerations which may be considered. A window should preferably cover at least one order in y-direction; the absolute minimum in x-direction is imposed by the order of the polynomial used in the approximation of echelle spectra orders; in case of the use of any anisotropic filtering (vide supra), the minimum useful window size is dictated by the properties of the anisotropic operator used; other criteria for the minimal window size may also be applied.

Since the most informative part of an echelle spectrum in the textural context lies in its central area, with a significantly degraded signal-to-noise ratio (SNR) on either side, it can be beneficial to select such a position and the size of window to ensure at least partial overlap with that high SNR section.

Implementations Aspects

The initial step in the 2D spectra construction may involve the denoising step as described in the 'Noise Removal' text section. The choice of the parameter $\lambda$ (eq. 2.) is important in this step. Its choice is influenced by the noise levels, which, in turn, can be obtained from an observed value of $\sigma$ of the noise. There is a number of ways a person skilled in the art may determine the value of $\sigma$ (see subsections 'c' and 'd' of the 'Noise Removal' text section for more details); one way is to segment the image into a set of vertical (i.e. perpendicular to the orders) segments and look for the variance of the signal in the sections known not to have any spectral lines. Once the value of $\sigma$ of the noise is obtained, the denoising procedure (eq. 2. or, equivalently, eq. 4.) may be carried out. The selection of the appropriate operators is described in the sub-sections 'a' and 'b' of the 'Noise Removal' text section. Demonstrated is the effect of the use of the denoising with the choice of H=I and A=I, and i=1 (eq. 4) to the 1D and 2D segments.

It will be understood by those skilled in the art that the invention is not limited to the embodiments described above and that many modifications and additions may be made before departing from the scope of the invention as defined in the appending claims.

The invention claimed is:

1. A method of processing a two-dimensional optical spectrum image comprising sections having a relatively high intensity separated by borders having a relatively low intensity, the method comprising:
    digitizing the two-dimensional optical spectrum image from an analyte using a two-dimensional array detector,
    applying a total variation denoising algorithm to the two-dimensional optical spectrum image to produce a denoised two-dimensional optical spectrum image, wherein the total variation denoising algorithm substantially preserves image detail while reducing noise,
    searching the denoised two-dimensional optical spectrum image for at least one series of neighboring local extrema of the two-dimensional optical spectrum image,
    fitting a line through each series of the neighboring local extrema, each line representing a section,
    identifying a plurality of peaks and their respective locations,
    storing the lines and the locations of the peaks as a template for the analyte, and
    using the template to analyze an analytical atomic spectrometry measurement of an analyte.

2. The method according to claim 1, further comprising:
    using feature extraction for fitting the line through each series of the neighboring local extrema.

3. The method according to claim 2, wherein the feature extraction comprises applying a Hough transform.

4. The method according to claim 1, wherein the lines fitted through each series of neighboring local extrema comprise substantially smooth lines.

5. The method according to claim 1, further comprising:
    using edge detection for searching for series of neighboring local extrema.

6. The method according to claim 1, wherein angles of the fitted lines relative to an axis of the two-dimensional optical spectrum image are limited to a predetermined range.

7. The method according to claim 1, wherein the neighboring local extrema of the two-dimensional optical spectrum image comprise local maxima.

8. The method according to claim 7, wherein each line represents a ridge of a respective section.

9. The method according to claim 1, wherein the neighboring local extrema of the two-dimensional optical spectrum image comprise local minima.

10. The method according to claim 9, wherein each line represents a border between the sections, and wherein preferably the lines are stored per pair.

11. The method according to claim 1, further comprising: determining an intensity of at least one identified peak.

12. The method according to claim 1, wherein the determined location of the at least one identified peak comprises an identification of the section in which each peak is located.

13. The method according to claim 1, wherein identifying a peak comprises determining a maximum within the section.

14. The method according to claim 1, further comprising:
    defining at least one partial spectrum, each partial spectrum being smaller than the two-dimensional optical spectrum image, and
    detecting boundaries of each partial spectrum.

15. The method according to claim 14, wherein at least two partial spectra are defined that have no overlap.

16. The method according to claim 14, wherein at least two partial spectra are defined that have some overlap.

17. The method according to claim 14, wherein the partial spectra together cover less than 50% of the two-dimensional optical spectrum image.

18. The method according to claim 14, wherein the two-dimensional optical spectrum image comprises a first area having a relatively high information density and a second area having a relatively low information density, wherein a first part of a partial spectrum covers the first area at least partially and a second part of said partial spectrum covers the second area at least partially, and wherein the lines of said first part are extrapolated to said second part.

19. The method according to claim 14, wherein at least one partial spectrum is located entirely in an area having a relatively low information density.

20. The method according to claim 14, wherein at least some partial spectra have been digitized using different exposure times.

21. The method according to claim 14, wherein at least four partial spectra are defined.

22. The method according to claim 14, further comprising fitting together the lines detected in the partial spectra so as to provide smooth lines.

23. The method according to claim 14, wherein a line detected in a partial spectrum is a substantially linear line.

24. The method according to claim 14, wherein a line detected in a partial spectrum is a substantially curved line described by a polynomial.

25. The method according to claim 1, wherein the two-dimensional optical spectrum image comprises an echelle spectrum and wherein the sections comprise orders of the echelle spectrum.

26. A method for detecting sections in a two-dimensional optical spectrum, the method comprising:
   producing the template by using the method according to claim 1, fitting a two-dimensional optical spectrum onto the template, and
   matching sections of the two-dimensional optical spectrum with sections of the template.

27. The method according to claim 26, wherein fitting the two-dimensional optical spectrum onto the template comprises image adjustment.

28. The method according to claim 27, wherein the image adjustment comprises at least one of rotating, scaling and projecting.

29. The method according to claim 26, wherein fitting the two-dimensional optical spectrum onto the template is carried out for at least one partial spectrum.

30. An optical spectrum processing device comprising a processor with an associated memory, wherein the processor is configured for carrying out the method according to claim 1.

* * * * *

UNITED STATES PATENT AND TRADEMARK OFFICE
CERTIFICATE OF CORRECTION

| | | |
|---|---|---|
| PATENT NO. | : 12,320,700 B2 | Page 1 of 1 |
| APPLICATION NO. | : 17/756840 | |
| DATED | : June 3, 2025 | |
| INVENTOR(S) | : Ayrat Murtazin et al. | |

It is certified that error appears in the above-identified patent and that said Letters Patent is hereby corrected as shown below:

On the Title Page

In Column 2, item (57) under ABSTRACT, Line 1, delete "two dimensional" and insert -- two-dimensional --, therefor.

In the Claims

In Column 20, Claim 10, Lines 51-52, delete "preferably the" and insert -- the --, therefor.

In Column 22, Claim 26, Line 10, delete "method according to" and insert -- method of --, therefor.

Signed and Sealed this
Twenty-fifth Day of November, 2025

John A. Squires
*Director of the United States Patent and Trademark Office*